(12) United States Patent
Jeong et al.

(10) Patent No.: US 12,425,595 B2
(45) Date of Patent: Sep. 23, 2025

(54) ENCODER SELECTING QUANTIZATION OPERATION, OPERATING METHOD OF ENCODER, AND VIDEO PROCESSING SYSTEM INCLUDING ENCODER

(71) Applicant: SAMSUNG ELECTRONICS CO., LTD., Suwon-si (KR)

(72) Inventors: Yowon Jeong, Suwon-si (KR); Byeungwoo Jeon, Suwon-si (KR); Jeeyoon Park, Suwon-si (KR); Motong Xu, Suwon-si (KR); Jeehwan Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 66 days.

(21) Appl. No.: 18/432,146

(22) Filed: Feb. 5, 2024

(65) Prior Publication Data
US 2024/0267521 A1 Aug. 8, 2024

(30) Foreign Application Priority Data
Feb. 6, 2023 (KR) .................. 10-2023-0015722

(51) Int. Cl.
*H04N 19/124* (2014.01)
*G06N 3/02* (2006.01)
(Continued)

(52) U.S. Cl.
CPC .................. *H04N 19/124* (2014.11)

(58) Field of Classification Search
CPC .... H04N 19/176; H04N 19/124; H04N 19/61; H04N 19/117; H04N 19/82; H04N 19/18;
(Continued)

(56) References Cited

U.S. PATENT DOCUMENTS 9,270,986 B2 2/2016 Yu et al.
10,484,689 B2 11/2019 Seok et al.
(Continued)

FOREIGN PATENT DOCUMENTS

| KR | 10-1790671 | 11/2017 |
| KR | 10-2021-0003125 | 1/2021 |
| WO | 2013154747 | 10/2013 |

*Primary Examiner* — Farhan Mahmud
(74) *Attorney, Agent, or Firm* — Morgan , Lewis & Bockius LLP

(57) ABSTRACT

An encoder and a video processing system including the encoder are provided. The encoder may include a quantization operation selection circuit configured to generate first data by performing a first quantization operation based on input data including image data of a frequency domain, to generate a feature value based on the first data, and to generate a control signal for selecting a second quantization operation or a rate-distortion optimized quantization (RDOQ) operation based on a machine learning model trained based on training data that includes the feature value. Additionally, the encoder may include a quantizer configured to perform the second quantization operation or the RDOQ operation based on the control signal and to generate output data (e.g., after performing the second quantization operation or the RDOQ operation).

20 Claims, 10 Drawing Sheets

(51) Int. Cl.
*G06N 3/08* (2023.01)
*G06N 20/00* (2019.01)

(58) Field of Classification Search
CPC ...... H04N 19/126; H04N 19/46; H04N 19/86; G06N 3/08; G06N 20/00; G06N 3/0455; G06N 3/0475; G06N 3/049; G06N 3/02
See application file for complete search history.

(56) References Cited

U.S. PATENT DOCUMENTS

| | | |
|---|---|---|
| 11,095,896 B2 | 8/2021 | Rusanovskyy et al. |
| 11,197,021 B2 | 12/2021 | Mao |
| 2015/0131719 A1* | 5/2015 | Huang ................. H04N 19/147 375/240.03 |
| 2020/0145662 A1* | 5/2020 | Park .................... G06V 10/764 |
| 2020/0162760 A1* | 5/2020 | Wassenberg ......... H04N 19/176 |

* cited by examiner

|  | SQ | HDQ | RDOQ |
|---|---|---|---|
| IMAGE QUALITY (SAME BITRATE) | WORST | WORSE | BEST |
| AMOUNT OF COMPUTATION | SMALLEST | SMALL | HUGE |

ENCODER SELECTING QUANTIZATION OPERATION, OPERATING METHOD OF ENCODER, AND VIDEO PROCESSING SYSTEM INCLUDING ENCODER

CROSS-REFERENCE TO RELATED APPLICATION

This application is based on and claims priority under 35 U.S.C. § 119 to Korean Patent Application No. 10-2023-0015722, filed on Feb. 6, 2023, in the Korean Intellectual Property Office, the disclosure of which is incorporated by reference herein in its entirety.

BACKGROUND

The present disclosure generally relates to an encoder and, more particularly, to an encoder that selects a quantization operation based on a feature value of input data, and a video processing system including the encoder.

Image processing technologies have become increasingly important in various fields including photography, video processing, computer vision, and more. Image processing or digital image processing refers to the use of a computer to process or edit a digital image using an algorithm or a processing network.

According to the development and spread of hardware capable of reproducing and storing high-resolution or high-definition video content, there is a growing need for encoders that effectively encode high-resolution or high-definition video content. Although encoding operations using various quantization methods may be performed on image data, quantization methods of performing encoding effectively may vary depending on image data. Accordingly, there is a growing need for selecting a quantization method that effectively performs encoding operations with a small amount of computation.

SUMMARY

The present disclosure describes an encoder capable of performing an encoding operation with a small amount of computation by selecting an efficient quantization method with respect to each image data based on a feature value of the image data and a system (e.g., a video processing system) including the encoder.

According to an aspect of the present disclosure, an encoder is provided that includes a quantization operation selection circuit configured to generate first data by performing a first quantization operation based on input data, the input data including image data of a frequency domain, to generate a feature value based on the first data, and to generate a control signal for selecting a second quantization operation or a rate-distortion optimized quantization (RDOQ) operation based on a machine learning model trained based on training data, the training data including the feature value; and a quantizer configured to perform the second quantization operation or the RDOQ operation based on the control signal and to generate output data.

According to another aspect of the present disclosure, a method of operating an encoder including receiving input data including image data of a frequency domain; generating first data based on performing a first quantization operation, the first quantization operation performed based on the input data; generating a feature value based on the first data; generating a control signal for selecting a second quantization operation or a rate-distortion optimized quantization (RDOQ) operation based on a machine learning model trained based on training data, the training data including the feature value; performing the second quantization operation or the RDOQ operation based on the control signal; and generating output data.

According to another aspect of the present disclosure, a system is provided including an encoder configured to convert image data of a spatial domain into first data of a frequency domain; generate second data based on performing a first quantization operation, the first quantization operation performed based on the first data; generate a feature value based on the second data; generate a control signal based on a machine learning model trained based on training data, the training data including the feature value; and perform a second quantization operation or a rate-distortion optimized quantization (RDOQ) operation based on the generated control signal.

BRIEF DESCRIPTION OF THE DRAWINGS

Embodiments will be more clearly understood from the following detailed description taken in conjunction with the accompanying drawings in which.

DETAILED DESCRIPTION OF THE EMBODIMENTS

In some cases, when a quantization operation is performed, high-quality data may be unable to be obtained with a small amount of computation. For example, some quantization operations (e.g., rate-distortion optimized quantization (RDOQ) operations) require a large amount of computation to obtain a good image quality. Additionally or alternatively, other quantization operations (e.g., scalar quantization (SQ) operations, hard decision quantization (HDQ) operations), etc.) may require a less amount of computation but may produce a lower image quality than the quantization operations that produce a good image quality with the large amount of computation.

As described herein, an encoder is provided that selects an efficient quantization operation through a machine learning model. For example, the encoder may include a quantization operation selection circuit that is configured to generate first data by performing a first quantization operation based on input data including image data of a frequency domain. Additionally, the quantization operation selection circuit may generate a feature value based on the first data and may generate a control signal for selecting a second quantization operation or a rate-distortion optimized quantization (RDOQ) operation by using a machine learning model. In some embodiments, the machine learning model may be trained based on training data that at least includes the feature value. Additionally, the encoder may include a quantizer configured to perform the second quantization operation or the RDOQ operation based on the control signal. Subsequently, the quantizer may be configured to generate output data (e.g., after performing the second quantization operation or the RDOQ operation).

Figure 1:
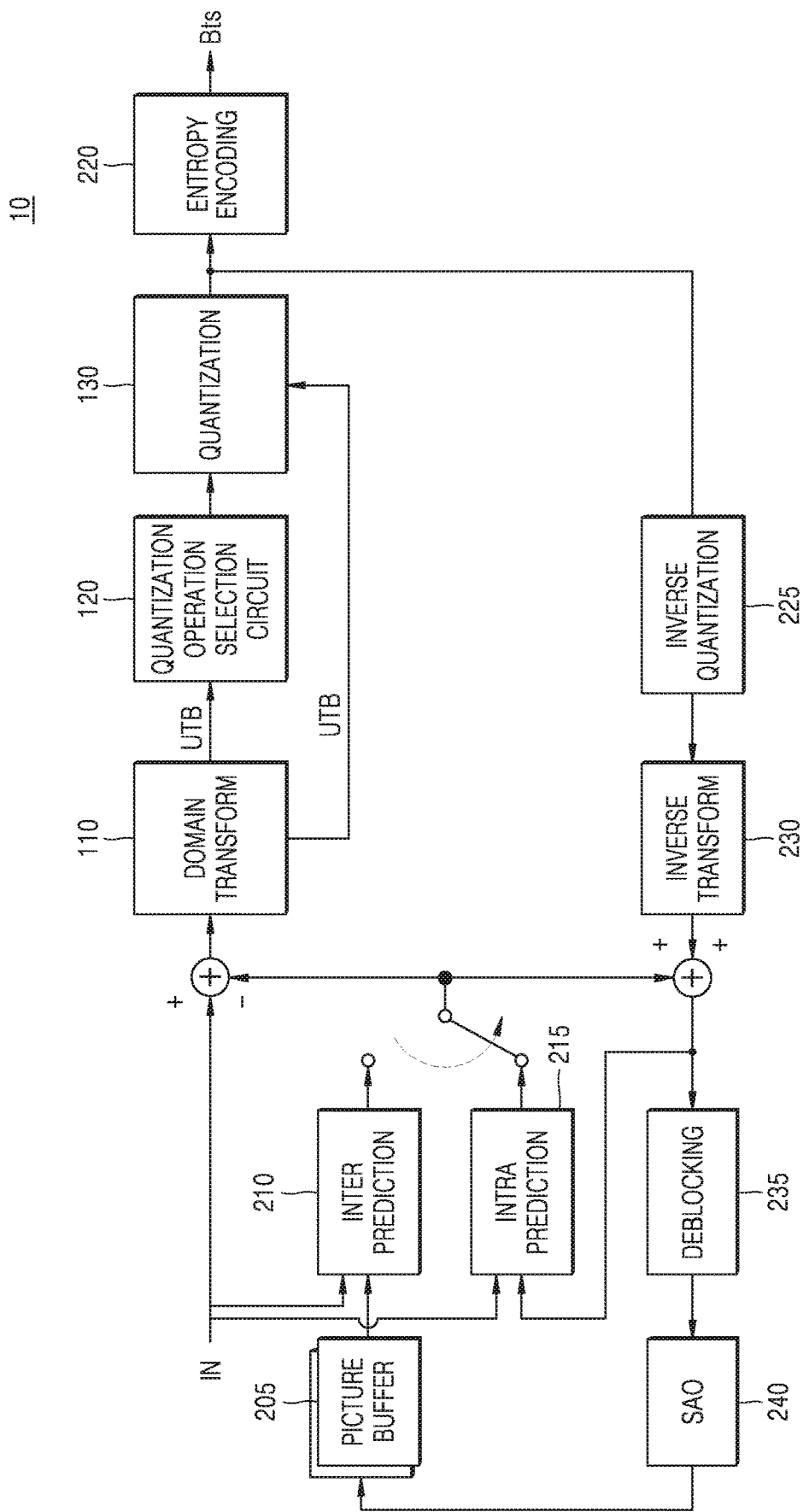
FIG. 1 is a block diagram illustrating an encoder according to an embodiment of the present disclosure.

FIG. 1 is a block diagram illustrating an encoder 10 according to an embodiment of the present disclosure.

Referring to FIG. 1, the encoder 10 may include a domain transform module 110, a quantization operation selection circuit 120, a quantizer 130, a picture buffer 205, an inter prediction module 210, and an intra prediction module 215, an entropy encoding module 220, an inverse quantization module 225, an inverse transform module 230, a deblocking module 235, and a sample adaptive offset (SAO) performing module 240. Blocks (e.g., modules included in the encoder 10) shown in the figures herein may be modules that perform specific functions on inputs to produce outputs or may be made of specialized or general purpose hardware and/or software configured to form such modules. For example, a block may be a hardware module designed through logic synthesis, etc., or a software module including a series of instructions executed by a processor.

The encoder 10 may perform a series of tasks for encoding image data. The intra prediction module 215 may perform intra prediction for each prediction unit with respect to an encoding unit of an intra mode of a current image, IN, and the inter prediction module 210 may perform inter prediction for each prediction unit with respect to an encoding unit of inter mode by using the current image, IN, and a reference image stored in the picture buffer 205. The current image, IN, may be split into maximum encoding units and then may be sequentially encoded. In this regard, encoding may be performed on an encoding unit to which the maximum encoding units are allocated in a tree structure.

Residual data may be generated by using a difference between prediction data with respect to an encoding unit of each mode output from the intra prediction module 215 or the inter prediction module 210 and data with respect to the encoding unit of the current image, IN. The residual data may be transmitted as an input of the domain transform module 110.

The domain transform module 110 may receive and convert image data of a spatial domain into image data of a frequency domain. In some embodiments, the domain transform module 110 may receive the residual data, and the received residual data may be the image data of the spatial domain. The domain transform module 110 may perform a Fourier transform or a discrete cosine transform on the image data of the spatial domain to generate the image data of the frequency domain.

In some embodiments, the image data of the frequency domain generated by the domain transform module 110 may be image data with respect to an image of a block unit and may be referred to as an unquantized transformed block (UTB). The block size of the UTB may include any one of 4×4, 8×8, or 16×16. The UTB may include as many transform coefficients, $T_{coeff}$, as the block size. For example, when the block size of the UTB is 4×4, the UTB may include 16 transform coefficients, $T_{coeff}$. The UTB generated by the domain transform module 110 may be transmitted as an input of the quantization operation selection circuit 120. However, the present disclosure is not limited thereto, and the block size of the UTB may be N×N (e.g., N is a positive integer), and the UTB may include N×N transform coefficients, $T_{coeff}$.

The quantization operation selection circuit 120 may perform a first quantization operation based on input data including frequency data to generate first data. In some embodiments, the quantization operation selection circuit 120 may receive the UTB from the domain transform module 110 and may perform the first quantization operation on the transform coefficients, $T_{coeff}$, included in the UTB. The first quantization operation may be an operation of generating levels, $L_{preQ}$, by applying Equation 1 (given below) to the transform coefficients, $T_{coeff}$, included in the UTB.

$$l_{preQ} = \frac{|T_{Coeff}|}{\Delta} \quad (1)$$

The level, $L_{preQ}$, may be a result value obtained by performing the first quantization operation on the transform coefficient, $T_{coeff}$, and may be a value obtained by dividing a quantization step size, $\Delta$, after applying an absolute value to the transform coefficient, $T_{coeff}$. The number of the levels, $L_{preQ}$, generated by performing the first quantization operation may be equal to the number of the transform coefficients, $T_{coeff}$, included in the UTB. Data including the levels, $L_{preQ}$, generated by performing the first quantization operation may be referred to as the first data.

In some embodiments, the first quantization operation may be an SQ operation. Some embodiments in this regard are described below with reference to FIG. 3.

The quantization operation selection circuit 120 may generate a feature value based on the first data. In some embodiments, the first data may include the levels, $L_{preQ}$, generated by performing the first quantization operation, and the quantization operation selection circuit 120 may generate the feature value including at least one of: a non-zero level; a sum of the levels, $L_{preQ}$; video coding mode information of the first data; or the block size of the first data, based on the levels, $L_{preQ}$. For example, each of the levels, $L_{preQ}$, may have a real value of zero (0) or more, and the levels, $L_{preQ}$, having a value other than zero (0) may be referred to as the non-zero level. The sum of the levels, $L_{preQ}$, may refer to a sum of respective real values of the levels, $L_{preQ}$. The video coding mode information of the first data may refer to an intra mode or an inter mode information of the first data. In some embodiments, the block size of the first data may be the same as the block size of the UTB. The feature value generated by the quantization operation selection circuit 120 may be a reference value for determining which quantization operation is to be performed on the UTB. Accordingly, an efficient quantization operation may be performed, and image quality of input data may be improved while reducing an amount of computation. Some embodiments in this regard are described below with reference to FIGS. 2B and 3.

The quantization operation selection circuit 120 may generate a control signal for selecting a quantization operation by using a machine learning model that is trained (e.g., completely trained) based on training data including the feature value. In some embodiments, the quantization operation selection circuit 120 may include the machine learning model and may train the machine learning model before performing an encoding operation by using the training data including the feature value. The machine learning model that is trained may generate a difference value corresponding to the feature value. For example, the difference value may include a difference between first output data and second output data. In some embodiments, the first output data may be generated by performing the SQ operation or an HDQ operation based on input data including frequency data. Additionally or alternatively, the second output data may be generated by performing an RDOQ operation based on the input data including the frequency data. Some embodiments in this regard are described below with reference to FIG. 3.

In some embodiments, the quantization operation selection circuit 120 may generate the control signal by comparing the difference value corresponding to the feature value generated by the trained machine learning model with a threshold value. According to the control signal, the quantizer 130 may determine which quantization operation to perform. Some embodiments in this regard are described below with reference to FIGS. 2B and 3.

In some embodiments, the machine learning model may be capable of determining a binary class, and the quantizer 130 may determine which quantization operation to perform according to the determined binary class (e.g., 0 or 1). Some embodiments in this regard are described below with reference to FIGS. 7 and 8.

The quantizer 130 may perform the quantization operation to generate quantized data. In some embodiments, the quantized data may be referred to as output data. In some embodiments, the quantizer 130 (e.g., a quantization module, hereinafter referred to as a quantizer) may perform a second quantization operation or the RDOQ operation based on the control signal. The second quantization operation may be a quantization operation with a smaller amount of computation than that of the RDOQ operation. For example, the second quantization operation may be the SQ operation or the HDQ operation.

In some embodiments, the second quantization operation may be an operation of generating output data based on the first data generated by performing the first quantization operation. Some embodiments in this regard are described below with reference to FIG. 3. In some embodiments, the quantizer 130 may generate the first data as the output data when receiving a control signal for selecting the second quantization operation. Some embodiments in this regard are described below with reference to FIG. 6.

The output data may be reconstructed as residual data of the spatial domain through the inverse quantization module 225 and the inverse transform module 230. The reconstructed residual data of the spatial domain may be added to the prediction data with respect to the encoding unit of each mode output from the intra prediction module 215 or the inter prediction module 210 and then reconstructed as image data of the spatial region with respect to the encoding unit of the current image, IN. The reconstructed image data of the spatial domain may be generated as a reconstructed image through the deblocking module 235 and the SAO performing module 240. The generated reconstructed image may be stored in the picture buffer 205. Reconstructed images stored in the picture buffer 205 may be used as reference images for inter prediction of other images. The output data quantized by the quantizer 130 may be output as a bit stream, Bts, through the entropy encoding module 220.

As described in the present disclosure, data on which encoding is performed by the encoder 10 is described as image data, but this is only an example, and it should be understood that the present disclosure may be applied to all data on which encoding may be performed, such as moving image data and audio data.

Figures 2A, 2B:
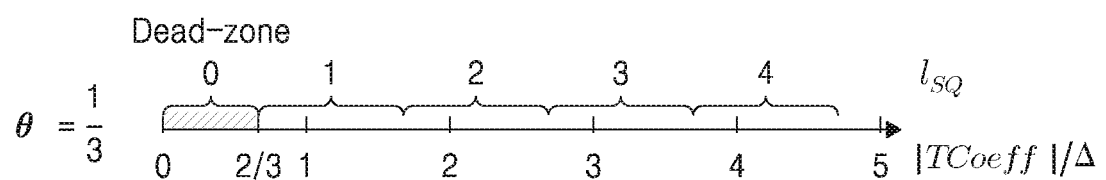
FIG. 2A is a table for explaining image quality and an amount of computation according to a quantization operation method of an encoder according to an embodiment of the present disclosure.
FIG. 2B is a graph for explaining a quantization operation method of an encoder according to an embodiment of the present disclosure.

FIG. 2A is a table for explaining image quality and an amount of computation according to a quantization operation method of an encoder according to an embodiment of the present disclosure. The table for explaining image quality and the amount of computation according to a quantization operation method of an encoder as described with reference to FIG. 2A may implement aspects of or may be implemented by aspects of components or modules as described with reference to FIG. 1.

Referring to FIG. 2A, the quantization operation method may include a SQ operation, a HDQ operation, and a RDOQ operation.

In some aspects, a quantization operation may include compression techniques achieved by compressing a range of values to a single quantum (discrete) value (e.g., a stream may become more compressible by reducing a number of discrete symbols in a given stream). In some aspects, in a scalar quantization operation, a scalar value is selected from a finite list of possible values to represent a sample.

In some embodiments, image quality of quantized data according to the quantization operation method and an amount of computation required for the quantization operation may have a trade-off relationship. Additionally, the image quality of the quantized data may be image quality of an image obtained by again decoding an output bitstream of the encoder that includes the corresponding quantization operation method, and a 'good' image quality may indicated the image is good compared to the capacity (or bit rate) of the output bitstream. As the image quality of quantized data improves, the amount of computation required for the quantization operation may increase, and accordingly, a lot of resources may be consumed. For example, image quality of data quantized by the HDQ operation may be better than image quality of data quantized by the SQ operation, and image quality of data quantized by the RDOQ operation may be better than the image quality of the data quantized by the HDQ operation. Additionally, an amount of computation required for the HDQ operation may be greater than an amount of computation required for the SQ operation, and an amount of computation required for the RDOQ operation may be greater than the amount of computation required for the HDQ operation.

FIG. 2B is a graph for explaining a quantization operation method of an encoder according to an embodiment of the present disclosure. Referring further to FIG. 2A, the graph of FIG. 2B may be a graph for explaining an SQ operation of FIG. 2A.

Referring to FIGS. 1 and 2B, the quantizer 130 may perform an SQ operation. In some embodiments, the quantizer 130 may receive a control signal for performing the SQ operation from the quantization operation selection circuit 120 and may receive a UTB from the domain transform module 110. The UTB may include as many transform coefficients, T$_{coeff}$, as the block size of the UTB. The quantizer 130 may perform the SQ operation on the transform coefficients, T$_{coeff}$, included in the UTB based on the control signal. The SQ operation may be an operation of generating levels, L$_{SQ}$, by applying Equation 2 (given below).

$$l_{SQ} = \left\lfloor \frac{|T_{Coeff}|}{\Delta} + \theta \right\rfloor \quad (2)$$

The level, L$_{SQ}$, may be a value obtained by performing the SQ operation on the transform coefficient, T$_{coeff}$. Additionally, the level, L$_{SQ}$, may be an integer value obtained by applying an absolute value to the transform coefficient, T$_{coeff}$; dividing the integer value by a quantization step size, $\Delta$; adding a quantization rounding offset, $\theta$ to division result; and truncating a decimal point after adding the quantization rounding offset, $\theta$. In the graph of FIG. 2B, a value of a coordinate axis (|Tcoeff|/$\Delta$) may be a value obtained by applying the absolute value to the transform coefficient, T$_{coeff}$, and dividing the quantization step size, $\Delta$, and a value of an upper coordinate axis may be the integer value (e.g., the level, L$_{SQ}$) obtained by adding the quantization rounding offset, $\theta$, to the value of the coordinate axis (|Tcoeff|/$\Delta$) and truncating the decimal point. For example, the quantization rounding offset, $\theta$, may be ⅓, and the level, L$_{SQ}$, may be zero (0) when the value of the coordinate axis ($\theta$/|Tcoeff|) has a value of zero (0) or more and less than ⅔. When the value of the coordinate axis (|Tcoeff|/$\Delta$) has a value of ⅔ or more and less than 5/3, the level, L$_{SQ}$, may be one (1).

Additionally or alternatively, the quantizer 130 may perform the HDQ operation. The HDQ operation may be an operation of generating quantized data by adaptively adjusting the quantization rounding offset, $\theta$, in the SQ operation described previously. In some embodiments, a value of the quantized data may have an integer value of zero (0) or more. An area where the value of the quantized data is zero (0) may be referred to as a dead-zone. For example, in FIG. 2B, an area where the value of the coordinate axis (|Tcoeff|/$\Delta$) is greater than zero (0) and less than ⅔ may be referred to as the dead zone. In some examples, coding efficiency may improve as the number of quantized data having a value of zero (0) increases, and the quantizer 130 may adjust the quantization rounding offset, $\theta$, to adjust the dead-zone. For example, the quantizer 130 may receive a control signal for performing the HDQ operation from the quantization operation selection circuit 120 and may receive a UTB from the domain transform module 110. The quantizer 130 may perform the HDQ operation on the transform coefficients, T$_{coeff}$, included in the UTB based on the control signal. The quantizer 130 may generate levels, L$_{HDQ}$, by applying Equation 2 to the UTB, and a level, L$_{HDQ}$, having a value other than zero (0) among the generated levels, L$_{HDQ}$, may be referred to as a non-zero level. According to the number of non-zero levels, the quantizer 130 may adjust the quantization rounding offset, $\theta$, to adjust the dead-zone. In some embodiments, the quantizer 130 may perform the HDQ operation by adjusting the quantization rounding offset, $\theta$, according to a luminance component or a chrominance component of the UTB.

Additionally or alternatively, the quantizer 130 may perform the RDOQ operation. The RDOQ operation may be an operation of determining optimal quantization levels of all the transform coefficients, T$_{coeff}$, included in input data at once. In some embodiments, the quantizer 130 may receive the control signal for performing the RDOQ operation from the quantization operation selection circuit 120 and may receive the UTB from the domain transform module 110. The quantizer 130 may perform the RDOQ operation on the transform coefficients, T$_{coeff}$, included in the UTB based on the control signal. In some aspects, a RDOQ operation may include efficient video compression operations (e.g., that systematically or sequentially determine quantized values for each transform coefficient within a specific transform block, or UTB, to reduce or minimize rate-distortion cost). In some aspects, values for each coefficient may be identified through a search across numerous potential quantized values. In some aspects, the quantized value of a coefficient may be influenced by its surrounding context (e.g., such as its position/location, previously established quantized values, etc.). In some examples, the RDOQ operation may be an operation of applying Equation 3 (given below) to the UTB.

$$J_{TB}(U, L) = D(U, Q^{-1}(L)) + \lambda \cdot R(L) \quad (3)$$

$$\hat{L} = \arg\min_{L}(J_{TB}(U, L))$$

L may denote a quantized transform block and may be referred to as a quantized transformed block (QTB). U may denote a transform block before quantization and may be a UTB. $Q^{-1}$ may denote inverse quantization, and D may denote a mean squared error of the QTB. R may denote a bitrate required to encode the QTB, and $\lambda$ may denote a Lagrange multiplier.

Based on the SQ operation calculating a quantization level with respect to the individual transform coefficient, T$_{coeff}$, the amount of computation required for the SQ operation may be less than the amount of computation of the RDOQ operation, and the image quality of the data quantized by the SQ operation may not be better than that of the data quantized by the RDOQ operation. Compared to the SQ operation, based on the HDQ operation adjusting the quantization rounding offset, $\theta$, the amount of computation may increase. However, based on the computation of the HDQ operation being simpler than that of the RDOQ operation, the amount of computation of the HDQ operation may be less than that of the RDOQ operation. The image quality of the data quantized by the HDQ operation may not be better than that of the data quantized by the RDOQ operation.

Figure 3:
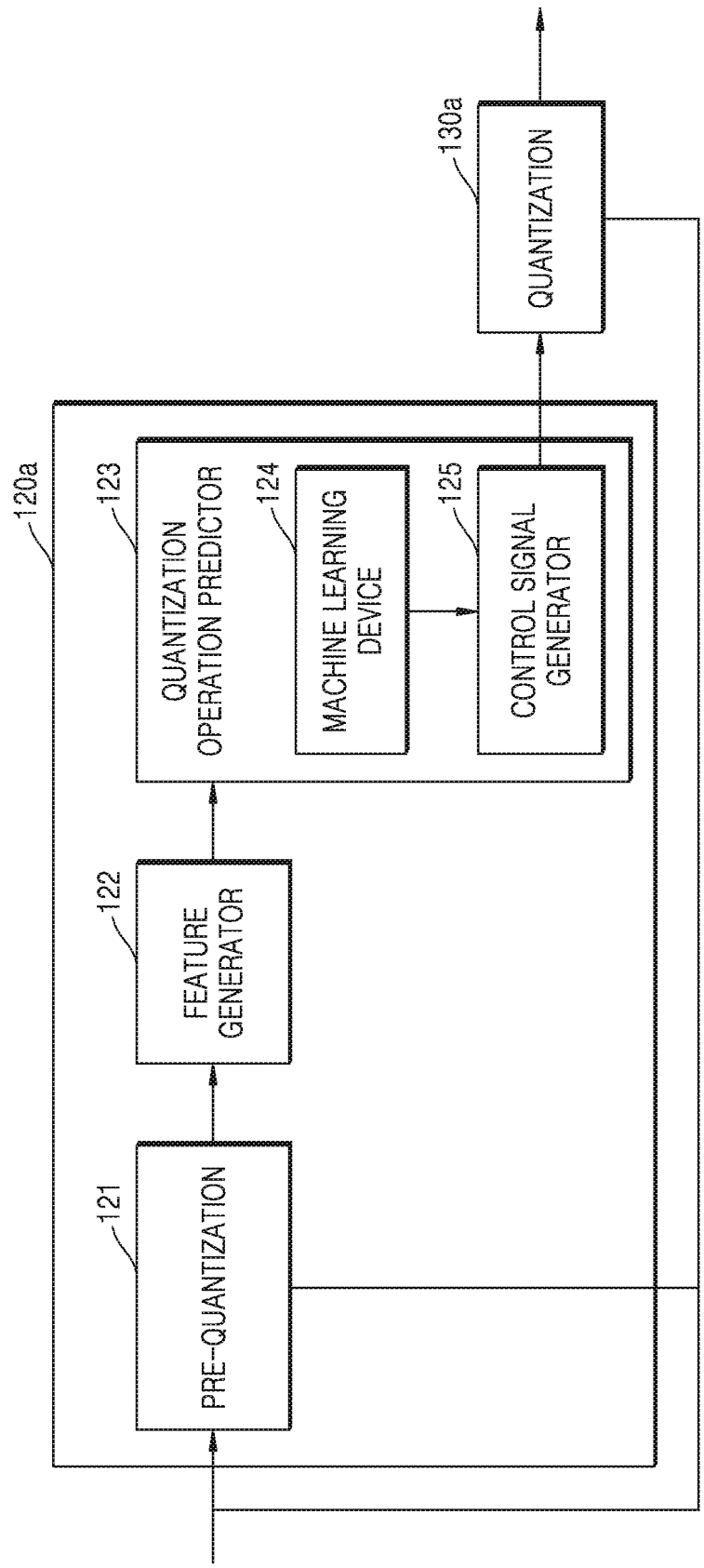
FIG. 3 is a block diagram illustrating an implementation example of an encoder according to an embodiment of the present disclosure.

FIG. 3 is a block diagram illustrating an implementation example of an encoder according to an embodiment of the present disclosure. In some embodiments, a quantization operation selection circuit 120*a* of FIG. 3 may represent an example of the quantization operation selection circuit 120 as described with reference to FIG. 1. Additionally, a quantizer 130*a* may represent an example of the quantizer 130 as described with reference to FIG. 1. Accordingly, any redundant description provided in FIG. 1 is omitted.

Referring to FIG. 3, the quantization operation selection circuit 120*a* may include a pre-quantizer 121, a feature generator 122, and a quantization operation predictor 123. The pre-quantizer 121 may generate first data, D1, by performing a first quantization operation based on input data including frequency data. In some embodiments, the pre-quantizer 121 may receive a UTB from the domain transform module 110 of FIG. 1 and may perform the first quantization operation on the transform coefficients, T$_{coeff}$, included in the UTB. The first quantization operation may be a quantization operation with a small amount of computation required for the operation. For example, the first quantization operation may be an operation of generating the levels, $L_{preQ}$, by applying Equation 1 as described with reference to FIG. 1, and the pre-quantizer 121 may transmit the first data, D1, including the generated levels, $L_{preQ}$, to the feature generator 122.

In some embodiments, the first quantization operation may be an SQ operation. For example, the first quantization operation may be an operation of generating the levels, $L_{preQ}$, by applying Equation 2 as described with reference to FIG. 2B, and the pre-quantizer 121 may transmit the first data, D1, including the generated levels, $L_{preQ}$, to the feature generator 122.

In some embodiments, the first quantization operation may be an HDQ operation. For example, the first quantization operation may be an operation of generating the levels, $L_{preQ}$, by adaptively adjusting a quantization rounding offset while applying Equation 2 as described with reference to FIG. 2B, and the pre-quantizer 121 may transmit the first data, D1, including the generated levels, $L_{preQ}$, to the feature generator 122.

The feature generator 122 may receive the first data, D1, from the pre-quantizer 121 and may generate a feature value, F, based on the received first data, D1. In some embodiments, the first data, D1, may include the levels, $L_{preQ}$, generated by performing the first quantization operation, and the feature generator 122 may generate the feature value, F, including at least one of: a non-zero level; a sum of the levels, $L_{preQ}$; video coding mode information (e.g., an intra mode or an inter mode) of the first data, D1; or the block size (e.g., 4×4, 8×8 or 16×16) of the first data, based on the levels, $L_{preQ}$. The feature generator 122 may transmit the generated feature value, F, to the quantization operation predictor 123.

In some embodiments, the first data D1 may be data including the levels, $L_{preQ}$, generated by applying Equation 1 as described with reference to FIG. 1. Each of the levels, $L_{preQ}$, generated by applying Equation 1 as described with reference to FIG. 1 may have a real value of zero (0) or more. In some embodiments, the first data, D1, may include data including the levels, $L_{preQ}$, generated by applying Equation 2 as described with reference to FIG. 2B. Each of the levels, $L_{preQ}$, generated by applying Equation 2 as described with reference to FIG. 2B may have an integer value of zero (0) or more. The case where the levels, $L_{preQ}$, included in the first data, D1, have the real value of zero (0) or more may have more information of the input data (e.g., UTB) than the case where the levels, $L_{preQ}$, have the integer value of zero (0) or more. The feature value, F, generated based on the first data, D1, may vary depending on the levels, $L_{preQ}$, included in the first data, D1.

In some embodiments, the quantization operation predictor 123 may include a machine learning device 124 and a control signal generator 125. The machine learning device 124 may receive the feature value, F, from the feature generator 122 and may generate a difference value, DB, by using a machine learning model that is trained (e.g., completely trained) based on training data that includes the received feature value, F. In some embodiments, the training data may further include the difference value, DB. For example, a difference between first output data (e.g., data generated by performing an SQ operation or a HDQ operation based on input data including image data of a frequency domain) and second output data (e.g., data generated by performing an RDOQ operation based on the input data including the frequency data) may be referred to as a difference value. The difference between the output data may be obtained by applying Equation 4 (given below).

$$diff = \sqrt{(L1 - L2)^2} \quad (4)$$

A level difference value, diff, may be a value obtained by multiplying a difference between a first level, L1, included in the first output data and a second level, L2, included in the second output data and taking the root of the multiplied difference. The difference value, DB, may include the level difference values, diff. The difference value, DB, may have the same form as the input data (e.g., UTB), and the number of the transform coefficients, $T_{coeff}$, of the input data (e.g., UTB) may be the same as the number of the level difference values, diff. In some embodiments, the difference value, DB, generated by the machine learning device 124 may be one real value obtained by averaging the level difference values, diff, calculated from the input data (e.g., UTB). The machine learning device 124 may generate the difference value, DB, corresponding to the feature value, F, by using a machine learning model that is trained based on training data that further includes the difference value, DB.

The control signal generator 125 may receive the difference value, DB, corresponding to the feature value, F, from the machine learning device 124 and may compare the difference value, DB, with a threshold value to generate a control signal, CS. In some embodiments, the control signal, CS, may be a signal for the quantizer 130a to select either a second quantization operation or the RDOQ operation. The second quantization operation may be the SQ operation or the HDQ operation. In some embodiments, the control signal generator 125 may generate the control signal, CS, for selecting the SQ operation or the HDQ operation when the difference value, DB, corresponding to the feature value, F, is less than the threshold value, and the quantizer 130a may perform the SQ operation or the HDQ operation based on the control signal, CS. When the difference value, DB, corresponding to the feature value, F, is less than the threshold value, there may be no difference between image quality of data quantized according to the SQ operation or the HDQ operation and image quality of data quantized according to the RDOQ operation.

In some embodiments, the control signal generator 125 may generate the control signal, CS, for selecting the RDOQ operation when the difference value, DB, corresponding to the feature value, F, is greater than or equal to the threshold value, and the quantizer 130a may perform the RDOQ operation based on the control signal, CS. When the difference value, DB, corresponding to the feature value, F, is greater than the threshold value, there may be a large difference between the image quality of the data quantized according to the SQ operation or the HDQ operation and the image quality of the data quantized according to the RDOQ operation.

Before performing the quantization operation, the quantization operation selection circuit 120a may generate the difference value, DB, corresponding to the feature value, F, and may generate the control signal, CS. Subsequently, the quantizer 130a may select whether to perform the second quantization operation or the RDOQ operation based on the control signal, CS, thereby improving the image quality of quantized data while reducing the amount of computation required for the quantization operation. That is, the quantizer 130a may perform the RDOQ operation requiring a large amount of computation when a difference in the image quality is greater than or equal to the threshold value.

The quantizer 130a may perform the SQ operation based on the control signal, CS, and may generate output data. In some embodiments, the quantizer 130a may receive input data from the domain transform module 110 as described with reference to FIG. 1 to perform the SQ operation and generate the output data. In some embodiments, the quantizer 130a may receive the first data, D1, including the levels, $L_{preQ}$, generated by applying Equation 1 as described with reference to FIG. 1 from the pre-quantizer 121 and may generate the output data by adding a quantization rounding offset to the first data, D1, and then applying a round off to the first data, D1. In some embodiments, the quantizer 130a may receive the first data, D1, including the levels, $L_{preQ}$, generated by applying Equation 2 as described with reference to FIG. 2B from the pre-quantizer 121 and may transmit the first data, D1, as the output data.

Figure 4:
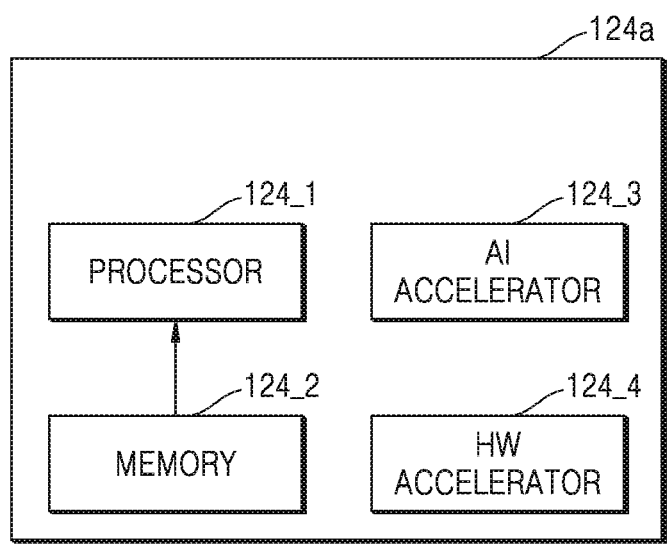
FIG. 4 is a block diagram illustrating an implementation example of a machine learning device according to an embodiment of the present disclosure.

FIG. 4 is a block diagram illustrating an implementation example of a machine learning device according to an embodiment of the present disclosure. In some embodiments, a machine learning device 124a of FIG. 4 may be an example of the machine learning device 124 as described with reference to FIG. 3. Accordingly, any redundant description with that of FIG. 4 is omitted.

Referring to FIG. 4, the machine learning device 124a may include at least one processor 124_1, a memory 124_2, an artificial intelligence (AI) accelerator 124_3, and a hardware accelerator 124_4. The at least one processor 124_1 may execute instructions. For example, the at least one processor 124_1 may execute an operating system by executing instructions stored in the memory 124_2 or may execute applications executed on the operating system. In some embodiments, the at least one processor 124_1 may execute the instructions to instruct the AI accelerator 124_3 and/or the hardware accelerator 124_4 to perform an operation, and to obtain a result of performing the operation from the AI accelerator 124_3 and/or the hardware accelerator 124_4. In some embodiments, the at least one processor 124_1 may be an application specific instruction set processor (ASIP) customized for a specific purpose and may support a dedicated instruction set.

The memory 124_2 may have an arbitrary structure storing data. For example, the memory 124_2 may include a volatile memory device such as dynamic random access memory (DRAM), static random access memory (SRAM), etc., or may include a non-volatile memory device such as flash memory, resistive random access memory (RRAM), etc.

The AI accelerator 124_3 may refer to hardware designed for AI applications. In some embodiments, the AI accelerator 124_3 may include a neural processing unit (NPU) implementing a neuromorphic structure, may generate output data by processing input data provided from the at least one processor 124_1 and/or the hardware accelerator 124_4, and may provide output data to the at least one processor 124_1 and/or the hardware accelerator 124_4. In some embodiments, the AI accelerator 124_3 may be programmable and may be programmed by the at least one processor 124_1 and/or the hardware accelerator 124_4.

The hardware accelerator 124_4 may refer to hardware designed to perform a specific task at high speed. For example, the hardware accelerator 124_4 may be designed to perform data transform such as demodulation, modulation, encoding, and decoding at high speed. The hardware accelerator 124_4 may be programmable and may be programmed by the at least one processor 124_1 and/or the hardware accelerator 124_4.

In some embodiments, the AI accelerator 124_3 may execute a machine learning model. For example, the memory 124_2 may store training data. The training data may include the number of non-zero levels; a sum of the levels, $L_{preQ}$; video coding mode information of first data; or a block size of the first data, and may further include a difference value. The AI accelerator 124_3 may execute a machine learning model, and the processor 124_1 may train the machine learning model off-line by using the training data. After the machine learning model is completed, the processor 124_1 may receive a feature value from the feature generator 122 of FIG. 3. The trained machine learning model may be used to generate a difference value corresponding to the feature value. The training data may further include other data in addition to the above-described data.

In some aspects, machine learning device 124a may include or refer to a microprocessor that specializes in the acceleration of machine learning algorithms. For example, machine learning device 124a may operate on predictive models such as artificial neural networks (ANNs) or random forests (RFs). In some cases, machine learning device 124a may be designed in a way that makes it unsuitable for general purpose computing such as that performed by a Central Processing Unit (CPU). Additionally or alternatively, the software support for machine learning device 124a may not be developed for general purpose computing.

For example, an ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During the training process, these weights are adjusted to improve the accuracy of the result (i.e., by minimizing a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

Figure 5:
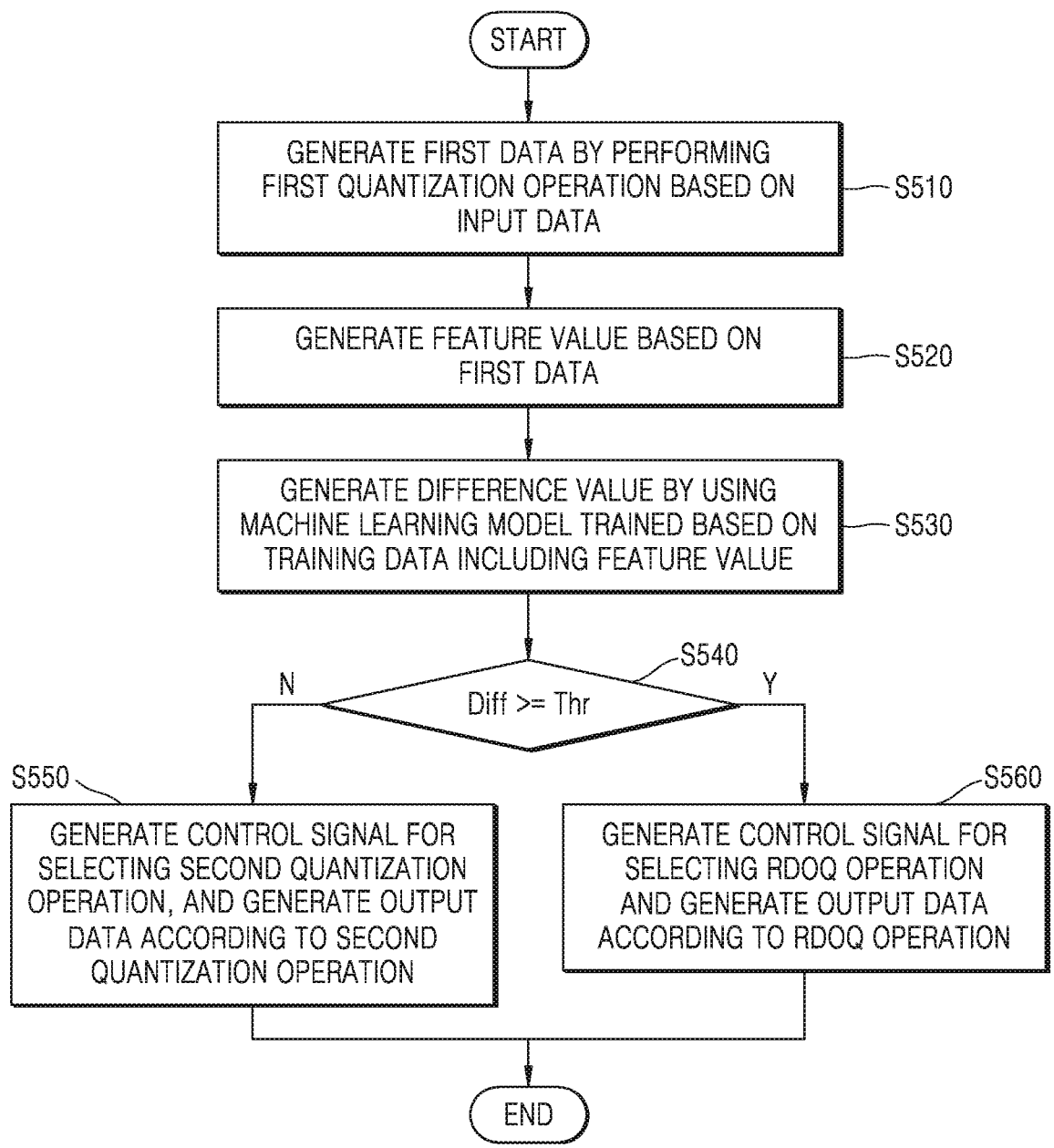
FIG. 5 is a flowchart illustrating a quantization operation method of an encoder according to an embodiment of the present disclosure.

FIG. 5 is a flowchart illustrating a quantization operation method of an encoder according to an embodiment of the present disclosure. In some examples, the flowchart illustrating the quantization operation method of the encoder as described with reference to FIG. 5 may implement aspects of or may be implemented by aspects as described with reference to FIGS. 1-4. As shown in FIG. 5, the quantization operation method of the encoder may include a plurality of operations (S510 to S560).

Referring to FIGS. 3 and 5, in operation S510, the pre-quantizer 121 may generate first data by performing a first quantization operation based on input data. In some embodiments, the pre-quantizer 121 may receive a UTB from the domain transform module 110 as described with reference to FIG. 1 and may perform a first quantization operation on the transform coefficients, $T_{coeff}$, included in the UTB. The first quantization operation may be a quantization operation with a small amount of computation required for the operation. For example, the first quantization operation may be an operation of generating the levels, $L_{preQ}$, by applying Equation 1 as described with reference to FIG. 1, and the pre-quantizer 121 may transmit the first data including the generated levels, $L_{preQ}$, to the feature generator 122.

In operation S520, the feature generator 122 may generate a feature value based on the first data. In some embodiments, the first data may include the levels, $L_{preQ}$, generated by performing the first quantization operation, and the feature generator 122 may generate the feature value including at least one of: a non-zero level; a sum of the levels, $L_{preQ}$; video coding mode information of the first data; or a block size of the first data based on the levels, $L_{preQ}$. The feature generator 122 may transmit the generated feature value to the quantization operation predictor 123.

In operation S530, the machine learning device 124 may generate the difference value, DB, by using a machine learning model trained based on training data including the feature value. In some embodiments, the training data may further include the difference value, DB. For example, a difference between first output data (e.g., data generated by performing an SQ operation or a HDQ operation based on input data including image data of a frequency domain) and second output data (e.g., data generated by performing an RDOQ operation based on the input data including the image data of the frequency domain) may be referred to as the difference value, DB. The difference between the output data may be obtained by applying Equation 4 as described with reference to FIG. 4.

In operation S540, the control signal generator 125 may receive the difference value, DB, corresponding to the feature value from the machine learning device 124 and may compare the difference value, DB, with a threshold value, Thr. In some embodiments, in operation S550, when the difference value, DB, corresponding to the feature value is smaller than the threshold value, Thr, in operation S550, the control signal generator 125 may perform a second quantization operation, and the quantizer 130a may generate output data according to the second quantization operation. In some embodiments, the control signal generator 125 may generate a control signal to select the SQ operation or the HDQ operation, and the quantizer 130a may perform the SQ operation or the HDQ operation based on the control signal. Additionally or alternatively, in operation S560, when the difference value, DB, corresponding to the feature value is greater than or equal to the threshold value, Thr, the control signal generator 125 may generate a control signal for selecting the RDOQ operation, and the quantizer 130a may generate output data according to the RDOQ operation.

Figure 6:
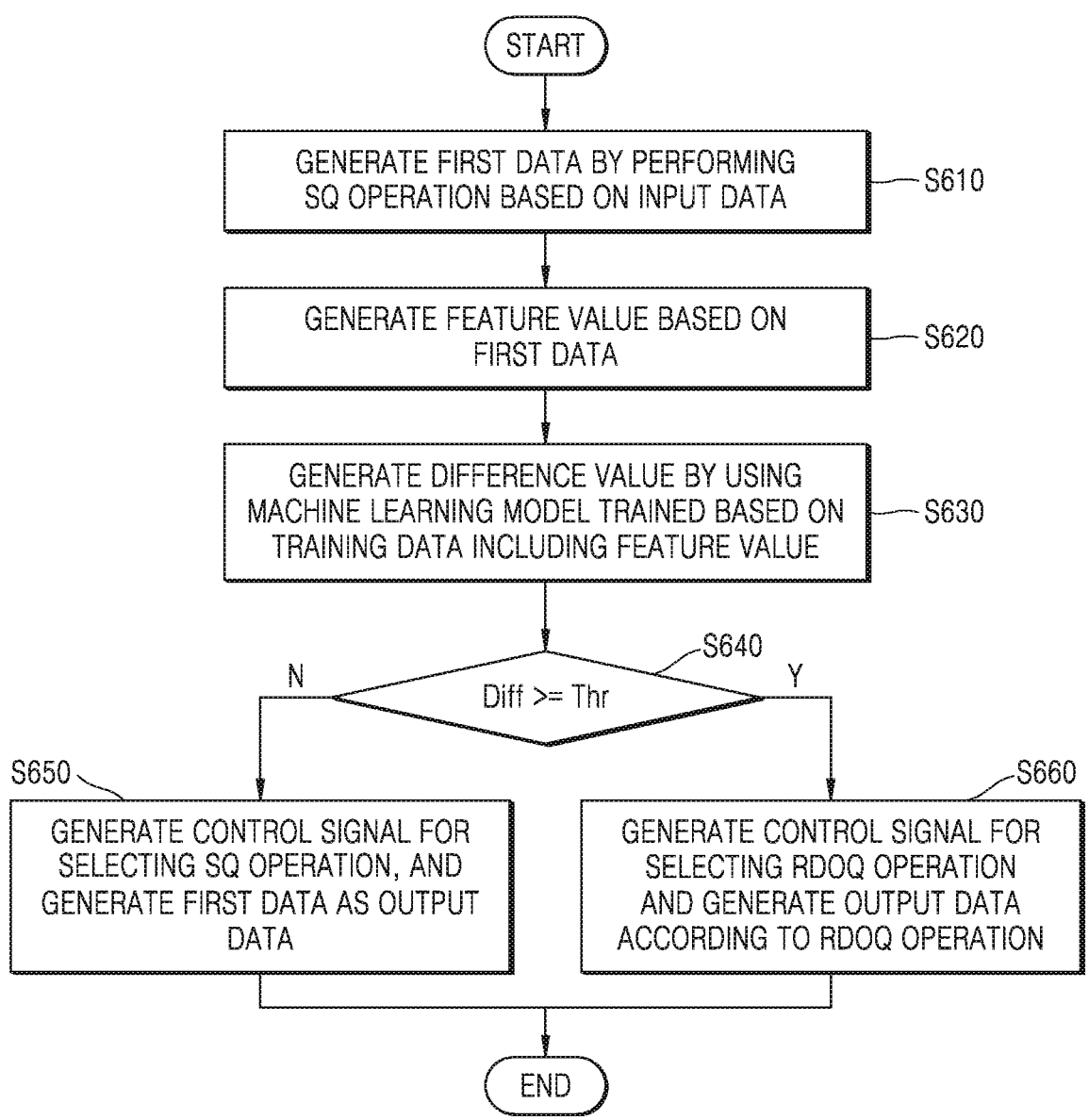
FIG. 6 is a flowchart illustrating an implementation example of a quantization operation method of an encoder according to an embodiment of the present disclosure.

FIG. 6 is a flowchart illustrating an implementation example of a quantization operation method of an encoder according to an embodiment of the present disclosure. In some examples, the flowchart illustrating the implementation example of the quantization operation method of the encoder as described with reference to FIG. 6 may implement aspects of or may be implemented by aspects as described with reference to FIGS. 1-5. As shown in FIG. 6, the quantization operation method of the encoder may include a plurality of operations S610 to S660. In some embodiments, operations S620, S630, S640, and S660 of FIG. 6 may be respectively the same as operations S520, S530, S540, and S560 of FIG. 5, and redundant descriptions with those of FIG. 5 are omitted.

Referring to FIGS. 3 and 6, in operation S610, the pre-quantizer 121 may generate first data by performing an SQ operation based on input data. In some embodiments, the pre-quantizer 121 may receive an UTB from the domain transform module 110 as described with reference to FIG. 1 and may perform the SQ operation on the transform coefficients, $T_{coeff}$, included in the UTB. A first quantization operation may be an operation of generating the levels, $L_{preQ}$, by applying Equation 2 as described with reference to FIG. 2B, and the pre-quantizer 121 may transmit the first data including the generated levels, $L_{preQ}$, to the feature generator 122.

In operation S650, when the difference value, DB, corresponding to the feature value is smaller than the threshold value, Thr, the control signal generator 125 may perform the SQ operation, and the quantizer 130a may generate the first data as output data. In some embodiments, the control signal generator 125 may generate a control signal for selecting the SQ operation. Subsequently, the quantizer 130a may receive the first data from the pre-quantizer 121 based on the control signal and may output the received first data as output data.

Figure 7:
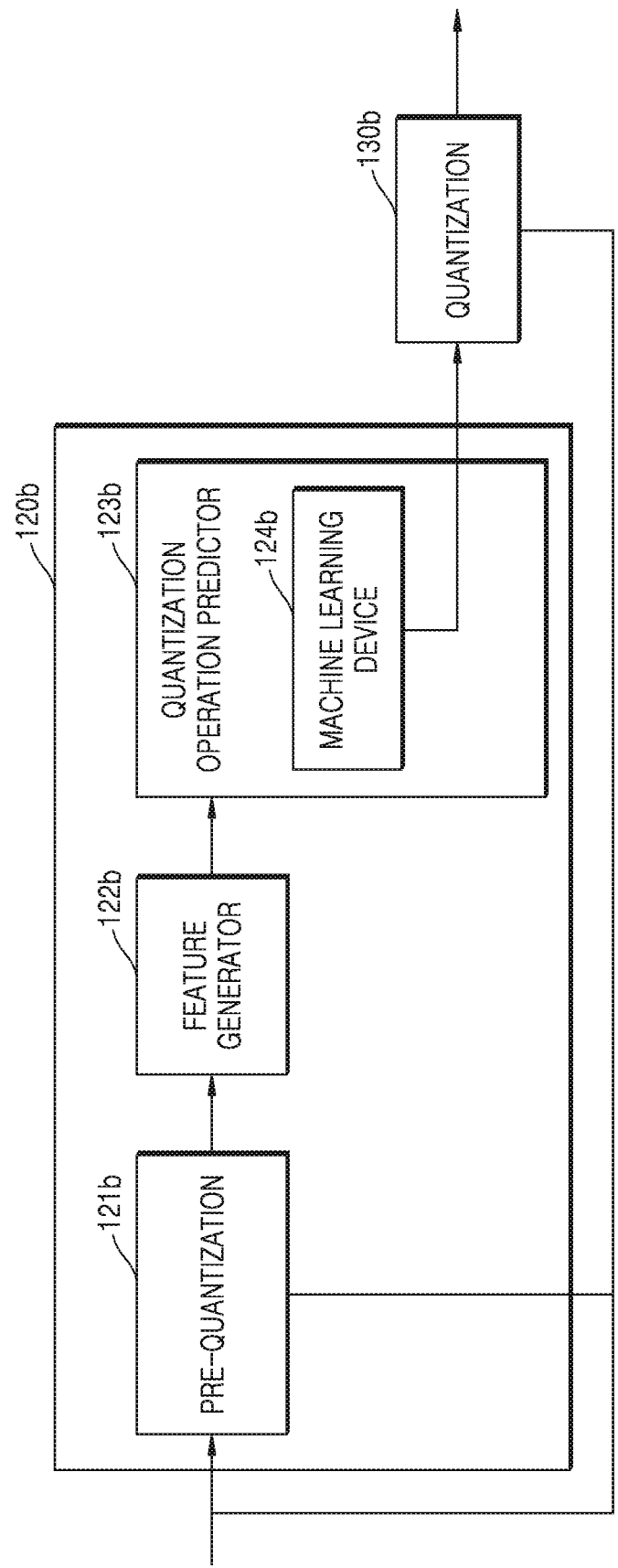
FIG. 7 is a block diagram illustrating an implementation example of an encoder according to an embodiment of the present disclosure.

FIG. 7 is a block diagram illustrating an implementation example of an encoder according to an embodiment of the present disclosure. In some examples, the block diagram illustrating the implementation example of the encoder as described with reference to FIG. 7 may implement aspects of or may be implemented by aspects as described with reference to FIGS. 1-6. In some embodiments, a quantization operation selection circuit 120b of FIG. 7 may represent an example of the quantization operation selection circuit 120 as described with reference to FIG. 1. Additionally, a quantizer 130b may represent an example of the quantizer 130 of FIG. 1. Accordingly, any redundant description with that of FIG. 1 is omitted.

Referring to FIG. 7, the quantization operation selection circuit 120b may include a pre-quantizer 121b, a feature generator 122b, and a quantization operation predictor 123b. The pre-quantizer 121b and the feature generator 122b may represent examples of the pre-quantizer 121 and feature generator 122 as described with reference to FIG. 3, and redundant descriptions with those of FIG. 3 are omitted.

The quantization operation predictor 123b may include a machine learning device 124b. The machine learning device 124b may receive the feature value, F, from the feature generator 122b and may classify a binary class by using a machine learning model that is trained based on training data including the received feature value. In some embodiments, the machine learning device 124b may classify the binary class as one (1) by using the trained machine learning model when a difference value between image quality of first output data (e.g., data generated by performing an SQ operation or a HDQ operation based on a feature value) and image quality of second output data (e.g., data generated by performing an RDOQ operation based on input data) is equal to or greater than a threshold value. Additionally or alternatively, the machine learning device 124b may classify the binary class as zero (0) by using the trained machine learning model when a difference value between the image quality of the first output data (e.g., data generated by performing the SQ operation or the HDQ operation based on the input data) and the image quality of the second output data (e.g., data generated by performing the RDOQ operation based on the input data) is less than the threshold value. When the binary class corresponding to the received feature value, F, is classified as one (1), the machine learning device 124b may generate the control signal, CS, for selecting the RDOQ operation and may transmit the control signal, CS, to the quantizer 130b. When the binary class corresponding to the received feature value, F, is classified as zero (0), the machine learning device 124b may generate the control signal, CS, for selecting the SQ operation or the HDQ operation and may transmit the control signal, CS, to the quantizer 130b.

In some embodiments, the machine learning device 124b may classify the binary class by using a machine learning model with a small amount of computation. For example, the machine learning model may be a linear classification model trained through a linear model and classifying the binary class with respect to the feature value, F. Additionally or alternatively, the machine learning model may be a support vector machine model trained through a non-linear kernel and classifying the binary class with respect to the feature value, F. Additionally or alternatively, the machine learning model may be a decision tree-based classification model trained through a tree structure model and classifying the binary class with respect to the feature value, F. Additionally or alternatively, the machine learning model may be a multi-layer perceptron model trained through a neural network model and classifying the binary class with respect to the feature value, F.

Figure 8:
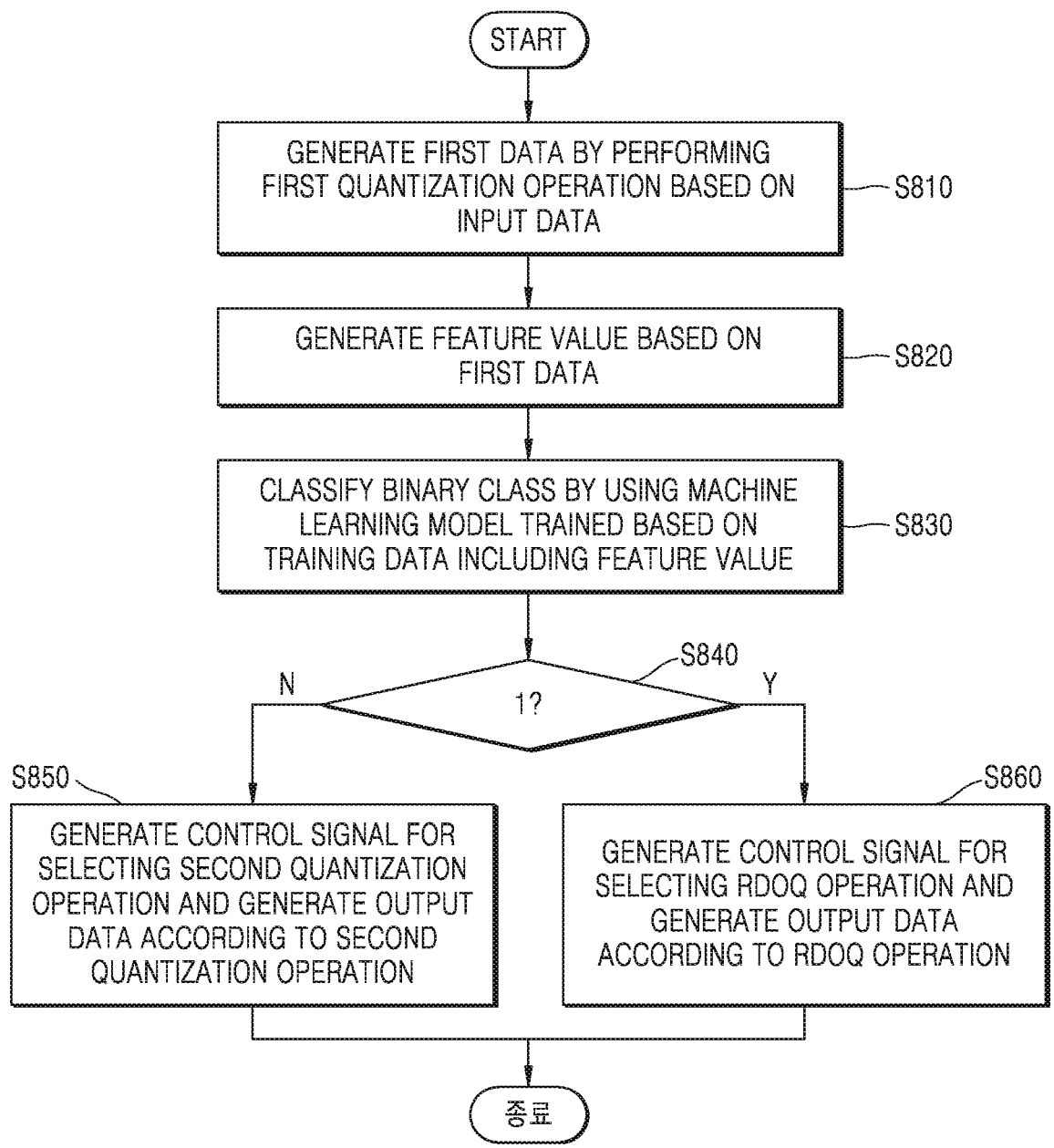
FIG. 8 is a flowchart illustrating an implementation example of a quantization operation method of an encoder according to an embodiment of the present disclosure.

FIG. 8 is a flowchart illustrating an implementation example of a quantization operation method of an encoder according to an embodiment of the present disclosure. In some examples, the flowchart illustrating the implementation example of the quantization operation method of the encoder as described with reference to FIG. 8 may implement aspects of or may be implemented by aspects as described with reference to FIGS. 1-7. As shown in FIG. 8, the quantization operation method of the encoder may include a plurality of operations S810 to S860. In some embodiments, operations S810 and S820 of FIG. 8 may be respectively the same as operations S510 and S520 of FIG. 5, and redundant descriptions with those of FIG. 5 are omitted.

Referring to FIGS. 7 and 8, in operation S830, the machine learning device 124b may classify a binary class with respect to a feature value by using a machine learning model trained based on training data including the feature value. In some embodiments, the machine learning device 124b may classify the binary class as one (1) by using the trained machine learning model when a difference between image quality of first output data (e.g., data generated by performing an SQ operation or a HDQ operation based on a feature value) and image quality of second output data (e.g., data generated by performing an RDOQ operation based on input data) is equal to or greater than a threshold value. Additionally or alternatively, the machine learning device 124b may classify the binary class as zero (0) by using the trained machine learning model when a difference between the image quality of the first output data (e.g., data generated by performing the SQ operation or the HDQ operation based on the input data) and the image quality of the second output data (e.g., data generated by performing the RDOQ operation based on the input data) is less than the threshold value.

In some embodiments, an operation of the machine learning device 124b is not limited to FIG. 8. For example, the machine learning device 124b may classify the binary class as zero (0) when the difference between the image quality of the first output data (e.g., data generated by performing the SQ operation or the HDQ operation based on the feature value) and the image quality of the second output data (e.g., data generated by performing the RDOQ operation based on the input data) is equal to or greater than the threshold value. Additionally or alternatively, the machine learning device 124b may classify the binary class as one (1) when the difference is less than the threshold value.

In operation S840, the machine learning device 124b may perform another operation when the binary class corresponding to the feature value is classified as one (1) or zero (0). In operation S850, when the binary class corresponding to the feature value is classified as zero (0), the machine learning device 124b may generate a control signal for selecting a second quantization operation and may transmit the control signal to the quantizer 130b. The quantizer 130b may generate output data according to the second quantization operation. For example, the second quantization operation may be the SQ operation or the HDQ operation.

Additionally or alternatively, in operation S860, when the binary class corresponding to the feature value is classified as one (1), the machine learning device 124b may generate a control signal for selecting the RDOQ operation and may transmit the control signal to the quantizer 130b. The quantizer 130b may generate output data according to the RDOQ operation.

In some embodiments, the operation of the machine learning device 124b is not limited to FIG. 8. For example, when the binary class corresponding to the feature value is classified as zero (0), the machine learning device 124b may generate the control signal for selecting the RDOQ operation. Additionally or alternatively, when the binary class corresponding to the feature value is classified as one (1), the machine learning device 124b may generate the control signal for selecting the second quantization operation.

Figure 9:
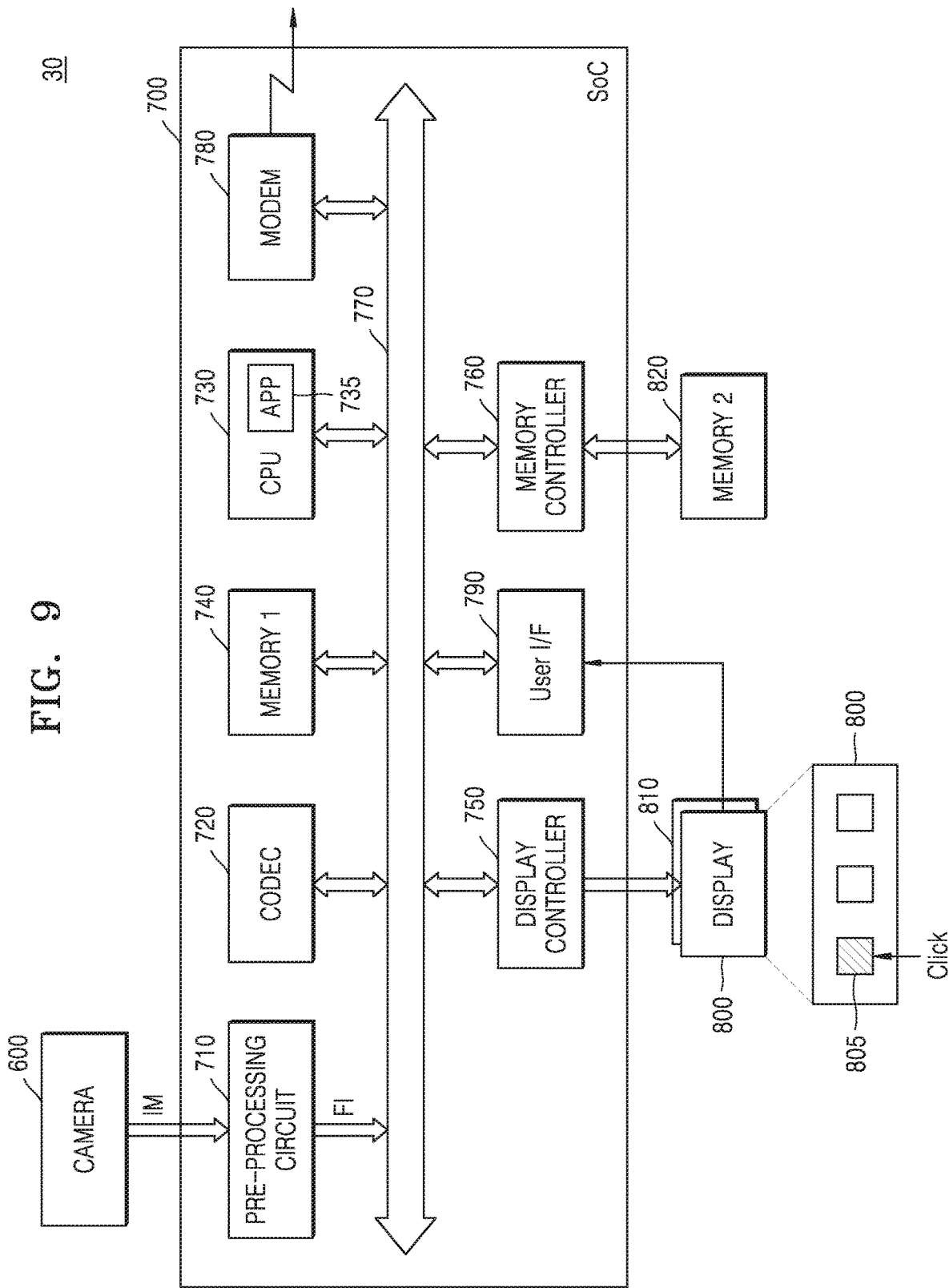
FIG. 9 is a block diagram illustrating a video processing system according to an embodiment of the present disclosure.

FIG. 9 is a block diagram illustrating a video processing system 30 according to an embodiment of the present disclosure. In some examples, the block diagram illustrating the video processing system 30 as described with reference to FIG. 9 may implement aspects of or may be implemented by aspects as described with reference to FIGS. 1-8.

Referring to FIG. 9, the video processing system 30 may include a camera 600, a system on chip (SoC) 700, a display 800, an input device 805, and a second memory 820. The video processing system 30 may refer to various devices capable of processing 2-dimensional (2D) or 3-dimensional (3D) graphics data and displaying the processed data. The video processing system 30 may be one of various devices that process video data. For example, the video processing system 30 may be a device including a display outputting video data, such as a mobile phone, a desktop PC, a laptop PC, a tablet PC, etc.; a device including a camera module generating video data, such as a digital camera, a digital camcorder, a smart phone, etc.; or a server that performs video encoding to transmit data through a communication channel such as a network. Additionally, the video processing system 30 may include one or more semiconductor chips as a part included in the above-mentioned devices and may also include a computer readable storage medium storing software including instructions executed by a CPU or GPU to perform video encoding.

The SoC 700 may control overall operations of the video processing system 30. The SoC 700 may include a pre-processing circuit 710, a codec 720, a CPU 730, a first memory 740, a display controller 750, a memory controller 760, a bus 770, a modem 780, and a user interface 790.

The pre-processing circuit 710 may receive first data, IM, output from the camera 600; may process the received first data, IM; and may output second data, FI, generated according to a processing result to the codec 720. The codec 720 may perform an encoding or decoding operation on each of a plurality of frames or blocks included in the second data, FI. The encoding operation may use a video data encoding technique such as the Joint Picture Expert Group (JPEG), Motion Picture Expert Group (MPEG), MPEG-2, MPEG-4, VC-1, H.264, H.265, or High Efficiency Video Coding (HEVC), but is not limited thereto. In FIG. 9, the codec 720 is implemented as a hardware codec, but the codec according to the present disclosure may be implemented as the hardware codec or a software codec. The software codec may be executed by the CPU 730. The codec 720 may include an encoder capable of selecting an efficient quantization operation based on the input data described above with reference to FIGS. 1-8 and may include a decoder that receives quantized data from the encoder and performs a decoding operation.

The CPU 730 may control the operation of the SoC 700. The first memory 740 may receive and store data encoded by the codec 720 as the application 735 is executed under the control of a memory controller. The display controller 750 may transmit data output from the codec 720 or the CPU 730 to the display 800. The input device 810 may transmit an input signal to the user interface 790. The user interface 790 may receive the input signal from the input device 810 and transmit data corresponding to the input signal to the CPU 730. The memory controller 760 may read data stored in the second memory 820 and transmit the read data to the codec 720 or the CPU 730 under the control of the codec 720 or the CPU 730.

Figure 10:
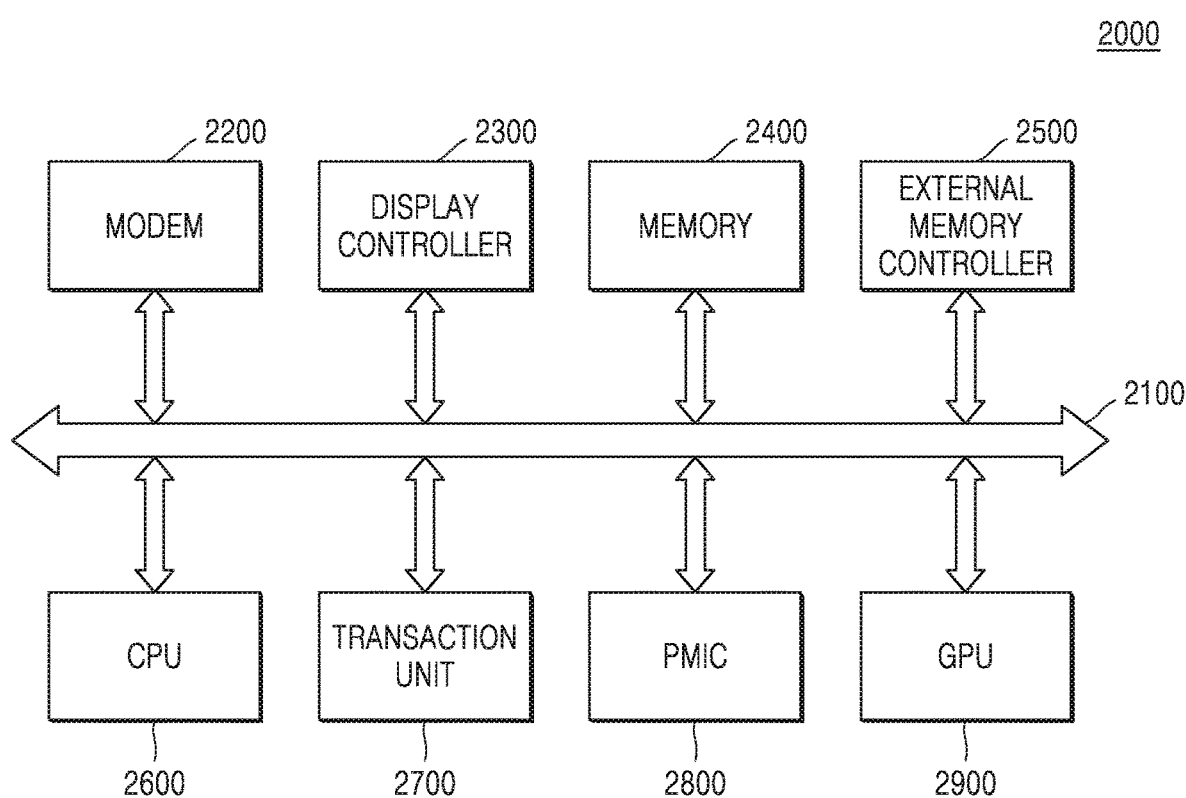
FIG. 10 is a block diagram illustrating a system on chip (SoC) according to an embodiment of the present disclosure.

FIG. 10 is a block diagram illustrating a SoC according to an embodiment of the present disclosure. In some examples, the block diagram illustrating the SoC as described with reference to FIG. 10 may implement aspects of or may be implemented by aspects as described with reference to FIGS. 1-9.

An SoC 2000 is a semiconductor device and may include an encoder or perform an operating method of the encoder according to an embodiment of the present disclosure. Additionally, the SoC 2000 may perform an efficient quantization operation selection method according to an embodiment of the present disclosure. The SoC 2000 implements complex functional blocks (e.g., intellectual properties (IPs)) performing various functions on a single chip and may generate encoded data (i.e., a bitstream) providing an improved image quality by performing the operation method of the encoder according to an embodiment of the present disclosure. For example, the SoC 2000 may perform the operating method of the encoder capable of selecting an efficient quantization operation based on input data described above with reference to FIGS. 1-8.

Referring to FIG. 10, the SoC 2000 may include a modem 2200, a display controller 2300, a memory 2400, an external memory controller 2500, a central processing unit (CPU) 2600, a transaction unit 2700, a PMIC 2800, and a graphic processing unit (GPU) 2900, and functional blocks of the SoC 2000 may communicate with each other through a system bus 2100.

In some aspects, CPU 2600 is an intelligent hardware device, (e.g., a general-purpose processing component, a digital signal processor (DSP), a microcontroller, an application specific integrated circuit (ASIC), a field programmable gate array (FPGA), a programmable logic device, a discrete gate or transistor logic component, a discrete hardware component, or any combination thereof). In some cases, CPU 2600 is configured to operate memory 2400 using a memory controller. In other cases, memory 2400 may be integrated into the CPU 2600. In some cases, CPU 2600 is configured to execute computer-readable instructions stored in memory 2400 to perform various functions. In some embodiments, CPU 2600 includes special purpose components for modem processing, baseband processing, digital signal processing, or transmission processing.

The CPU 2600 capable of controlling the overall operation of the SoC 2000 may control operations of the other functional blocks 2200, 2300, 2400, 2500, 2700, 2800, and 2900. In some embodiments, the CPU 2600 may perform the operating method of the encoder according to an embodiment of the present disclosure by executing instructions stored in the memory 2400. For example, the CPU 2600 may generate a bitstream by encoding original data received from the external memory controller 2500 and may transmit the generated bitstream to the modem 2200. Additionally or alternatively, in some embodiments, the CPU 2600 may perform the efficient quantization operation selection method according to an embodiment of the present disclosure by executing the instructions stored in the memory 2400.

The modem 2200 may demodulate a signal received from the outside of the SoC 2000 or may modulate a signal generated inside the SoC 2000 and may transmit the signal to the outside. The external memory controller 2500 may control an operation of transmitting and receiving data to and from an external memory device connected to the SoC 2000. For example, programs and/or data stored in the external memory device may be provided to the CPU 2600 or the GPU 2900 under the control of the external memory controller 2500.

The GPU 2900 may execute program instructions related to graphics processing. The GPU 2900 may receive graphic data through the external memory controller 2500 or transmit graphic data processed by the GPU 2900 to the outside of the SoC 2000 through the external memory controller 2500.

The transaction unit 2700 may monitor a data transaction of each functional block, and the PMIC 2800 may control power supplied to each functional block under the control of the transaction unit 2700. The display controller 2300 may control a display (or a display device) outside the SoC 2000 to transmit data generated inside the SoC 2000 to the display.

The memory 2400 may include a non-volatile memory such as (Electrically Erasable Programmable Read-Only Memory (EEPROM), flash memory, Phase Change Random Access Memory (PRAM), Resistance Random Access Memory (RRAM), Nano Floating Gate Memory (NFGM), Polymer Random Access Memory (PoRAM), Magnetic Random Access Memory (MRAM), Ferroelectric Random Access Memory (FRAM), etc., and may include a volatile memory such as Dynamic Random Access Memory (DRAM), Static Random Access Memory (SRAM), Mobile DRAM, Double Data Rate Synchronous Dynamic Random Access Memory (DDR SDRAM), Low Power DDR (LPDDR) SDRAM, Graphic DDR (GDDR) SDRAM, Rambus Dynamic Random Access Memory (RDRAM), etc. The memory 2400 may store the bitstream.

While the present disclosure has been particularly shown and described with reference to embodiments thereof, it will be understood that various changes in form and details may be made therein without departing from the spirit and scope of the following claims.

What is claimed is:

1. An encoder comprising:
a quantization operation selection circuit configured to:
generate first data by performing a first quantization operation based on input data, the input data comprising image data of a frequency domain;
generate a feature value based on the first data; and
generate a control signal for selecting a second quantization operation or a rate-distortion optimized quantization (RDOQ) operation based on a machine learning model trained based on training data, the training data comprising the feature value; and
a quantizer configured to:
perform the second quantization operation or the RDOQ operation based on the control signal; and
generate output data.

2. The encoder of claim 1, wherein the first quantization operation comprises an operation of generating the first data based on applying an absolute value to the input data and dividing the input data with the absolute value applied by a quantization step size.

3. The encoder of claim 1, wherein the feature value comprises at least one of: a number of non-zero levels of the first data, a sum of levels of the first data, video coding mode information of the first data, a size of the input data, or a combination thereof.

4. The encoder of claim 1, wherein the quantization operation selection circuit comprises:
a pre-quantizer configured to perform the first quantization operation;
a feature generator configured to generate the feature value; and
a quantization operation predictor configured to generate the control signal based on the machine learning model.

5. The encoder of claim 4, wherein:
the training data comprises a difference value between first output data and second output data, the first output data generated based on performing the second quantization operation based on the input data and the second output data generated based on performing the RDOQ operation based on the input data; and
the quantization operation predictor comprises:
a machine learning device configured to, based on the training data, generate a difference value corresponding to the feature value; and
a control signal generator configured to receive the difference value corresponding to the feature value and to generate the control signal based on comparing the difference value corresponding to the feature value with a threshold value.

6. The encoder of claim 4, wherein:
the machine learning model comprises a machine learning model configured to classify a binary class based on the training data; and
the quantization operation predictor is configured to generate the control signal for selecting the second quantization operation or the RDOQ operation based on the classified binary class.

7. The encoder of claim 6, wherein the machine learning model comprises at least one of: a linear classification model, a support vector machine model, a decision tree-based classification model, a multilayer perceptron model, or a combination thereof.

8. The encoder of claim 1, wherein the second quantization operation comprises at least one of a scalar quantization (SQ) operation or a hard decision quantization (HDQ) operation.

9. The encoder of claim 1, wherein:
the first quantization operation generates the first data based on performing a scalar quantization (SQ) operation on the input data; and
the quantizer is configured to generate the first data as the output data based on receiving the control signal for selecting the second quantization operation.

10. The encoder of claim 2, wherein, based on receiving the control signal for selecting the second quantization operation, the quantizer is configured to:
receive the first data from the quantization operation selection circuit;
add a quantization rounding offset to the first data; and
apply a round off to the first data with the quantization rounding offset added to generate the output data.

11. A method of operating an encoder, the method comprising:
receiving input data comprising image data of a frequency domain;
generating first data based on performing a first quantization operation, the first quantization operation performed based on the input data;
generating a feature value based on the first data;
generating a control signal for selecting a second quantization operation or a rate-distortion optimized quantization (RDOQ) operation based on a machine learning model trained based on training data, the training data comprising the feature value;
performing the second quantization operation or the RDOQ operation based on the control signal; and
generating output data.

12. The method of claim 11, wherein the first quantization operation comprises an operation of generating the first data based on applying an absolute value to the input data and dividing the input data with the absolute value applied by a quantization step size.

13. The method of claim 11, wherein:
the training data comprises a difference value between first output data and second output data, the first output data generated based on performing the second quantization operation based on the input data and the second output data generated based on performing the RDOQ operation based on the input data; and
the generating of the control signal comprises:
generating a difference value corresponding to the feature value based on the machine learning model; and
generating the control signal based on comparing the difference value corresponding to the feature value with a threshold value.

14. The method of claim 11, wherein the second quantization operation comprises at least one of a scalar quantization (SQ) operation or a hard decision quantization (HDQ) operation.

15. The method of claim 11, wherein the feature value comprises at least one of: a number of non-zero levels of the first data, a sum of levels of the first data, video coding mode information of the first data, a size of the input data, or a combination thereof.

16. A system comprising:
an encoder configured to:
convert image data of a spatial domain into first data of a frequency domain;
generate second data based on performing a first quantization operation, the first quantization operation performed based on the first data;
generate a feature value based on the second data;

generate a control signal based on a machine learning model trained based on training data, the training data comprising the feature value; and perform a second quantization operation or a rate-distortion optimized quantization (RDOQ) operation based on the generated control signal.

17. The system of claim 16, wherein the encoder comprises:

a domain transform module configured to convert the image data of the spatial domain into the first data of the frequency domain;

a pre-quantizer configured to perform the first quantization operation;

a feature generator configured to generate the feature value;

a quantization operation predictor configured to generate the control signal, wherein the control signal comprises a signal for selecting the second quantization operation or the RDOQ operation based on the machine learning model; and a quantizer configured to perform the second quantization operation or the RDOQ operation based on the control signal and to generate output data.

18. The system of claim 16, wherein the first quantization operation comprises an operation of generating the second data based on applying an absolute value to the first data and dividing the first data with the absolute value applied by a quantization step size.

19. The system of claim 16, wherein the feature value comprises at least one of: a number of non-zero levels of the second data, a sum of levels of the second data, video coding mode information of the second data, a size of the first data, or a combination thereof.

20. The system of claim 16, wherein the second quantization operation comprises at least one of a scalar quantization (SQ) operation or a hard decision quantization (HDQ) operation.

* * * * *